United States Patent [19]
Bethe

[11] 4,169,172
[45] Sep. 25, 1979

[54] NO-GEL LATEX FOAM

[76] Inventor: Eugene J. Bethe, 210 E. 8th St., Mishawaka, Ind. 46544

[21] Appl. No.: 859,627

[22] Filed: Dec. 12, 1977

Related U.S. Application Data

[63] Continuation of Ser. No. 626,961, Oct. 29, 1975, abandoned.

[51] Int. Cl.² .......................... B05D 1/36; B05D 3/02; B05D 7/04; B29D 27/04
[52] U.S. Cl. ..................................... 427/244; 521/71; 264/213; 521/88; 521/148; 521/150
[58] Field of Search ..................... 264/213; 260/2.5 L; 427/244

[56] References Cited
U.S. PATENT DOCUMENTS

| | | | |
|---|---|---|---|
| 3,243,491 | 3/1966 | Bethe | 260/2.5 L X |
| 3,650,995 | 3/1972 | Erickson | 260/2.5 L |

*Primary Examiner*—James R. Hoffman
*Attorney, Agent, or Firm*—Philip Rodman

[57] ABSTRACT

A no-gel latex foam is formed by curing a no-gel latex foam froth on a water vapor-permeable foraminous support means comprising a backing material that has been coated with a water soluble release agent. During curing, the foam froth dehydrates through an upper free surface and at its lower supported surface through the release agent and the foraminous support means. The cured foam is then removed from the foraminous support means free of any backing material.

20 Claims, 14 Drawing Figures

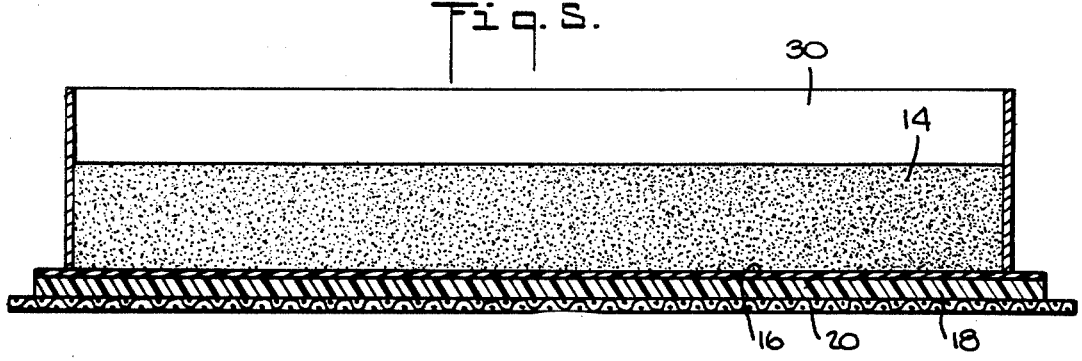
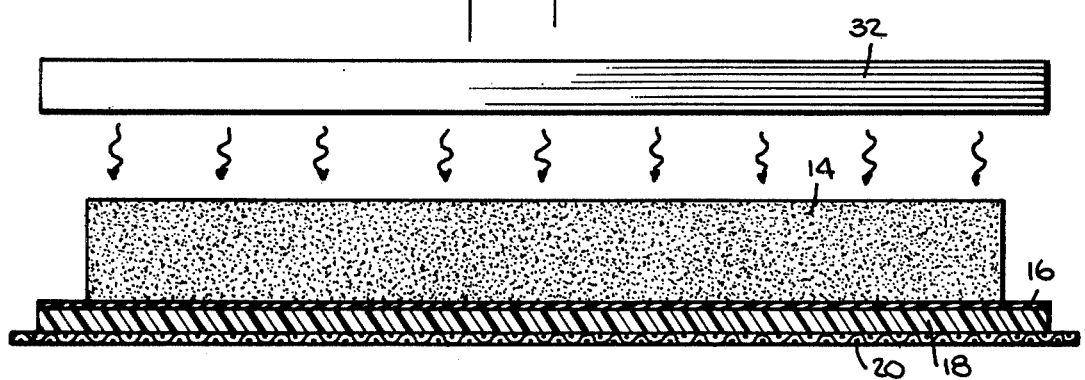
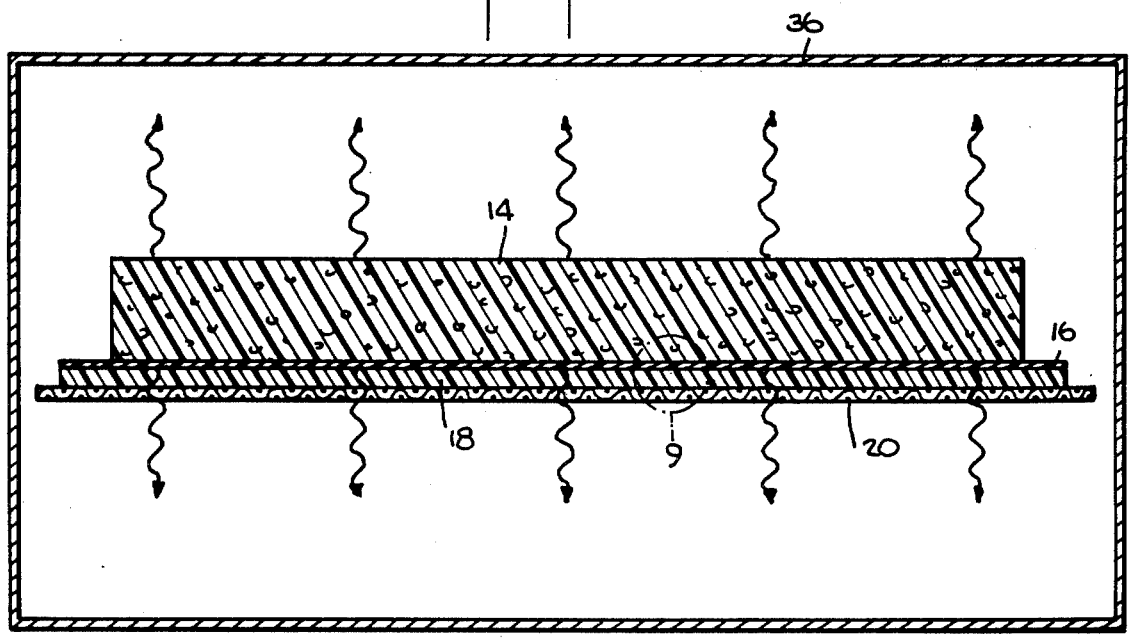

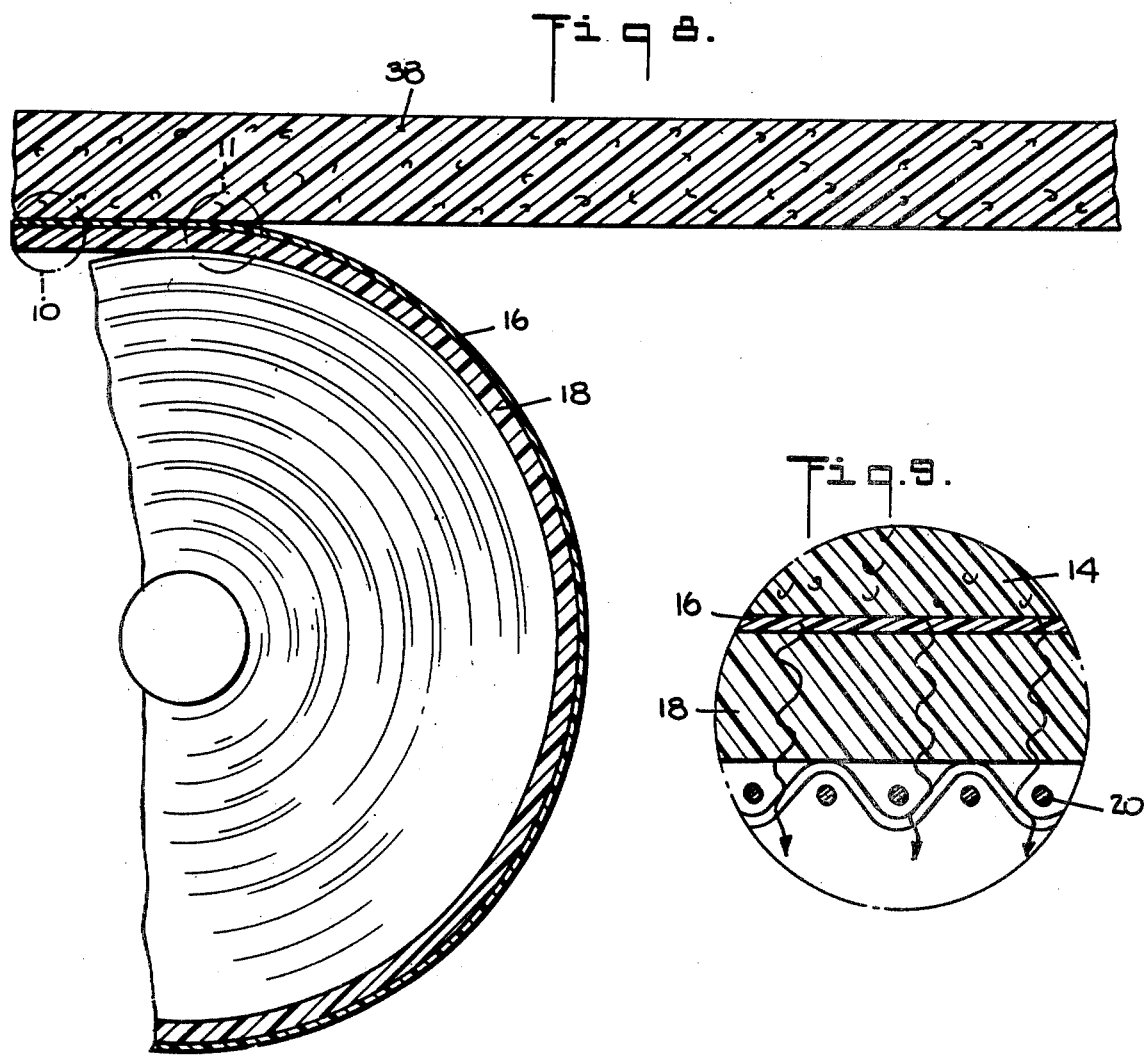
Fig. 8.
Fig. 9.
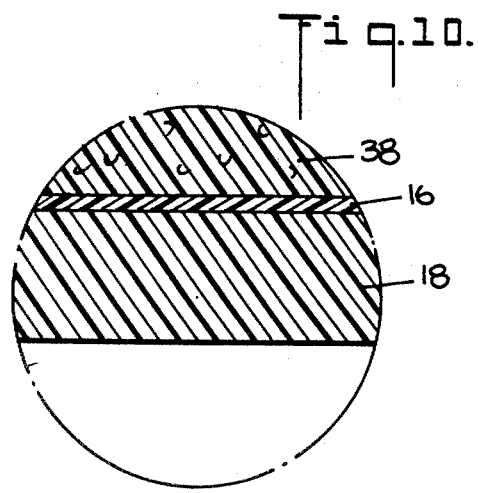
Fig. 10.
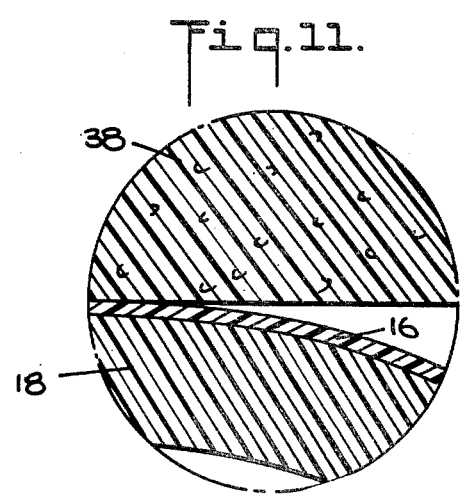
Fig. 11.

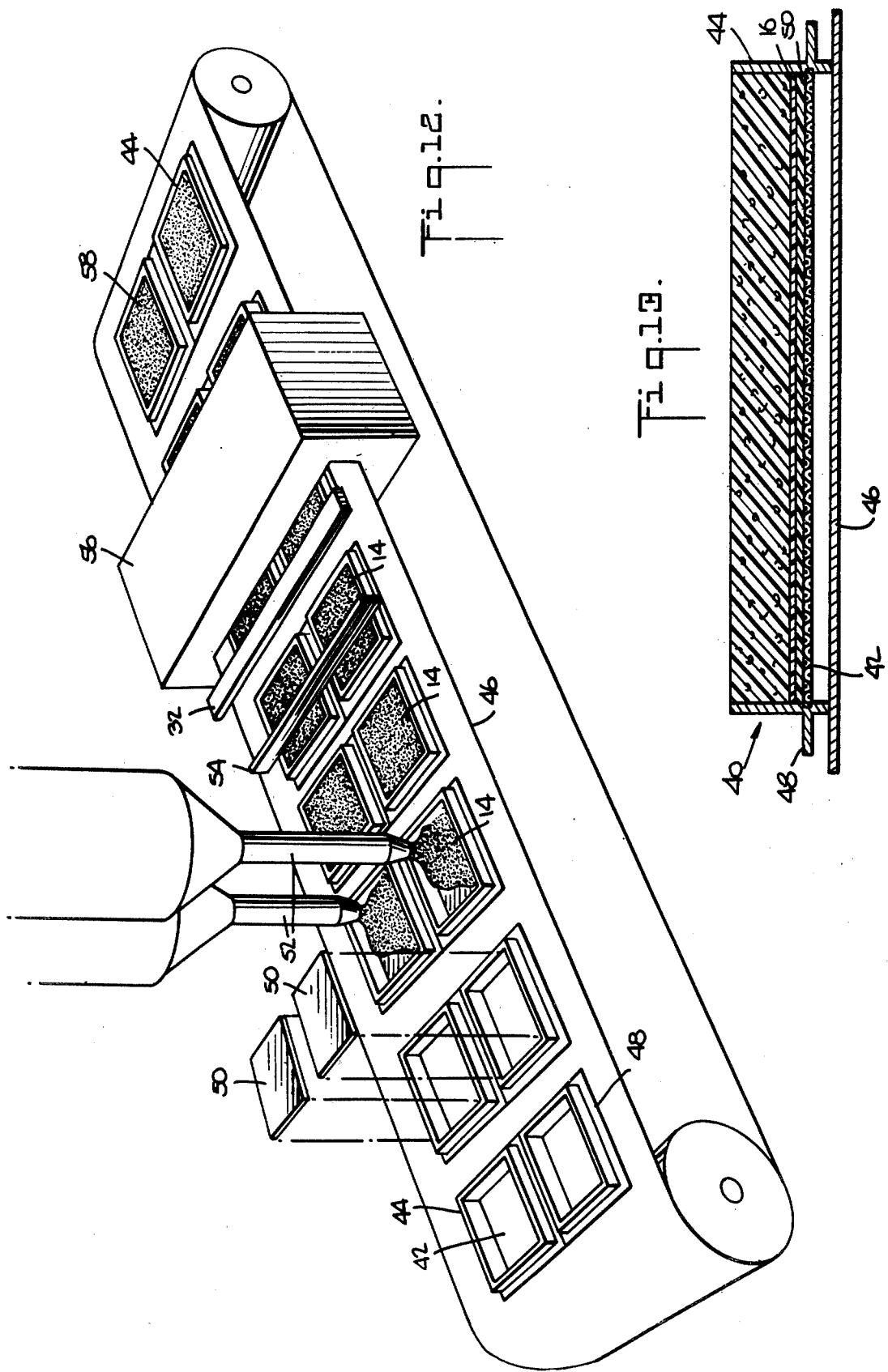

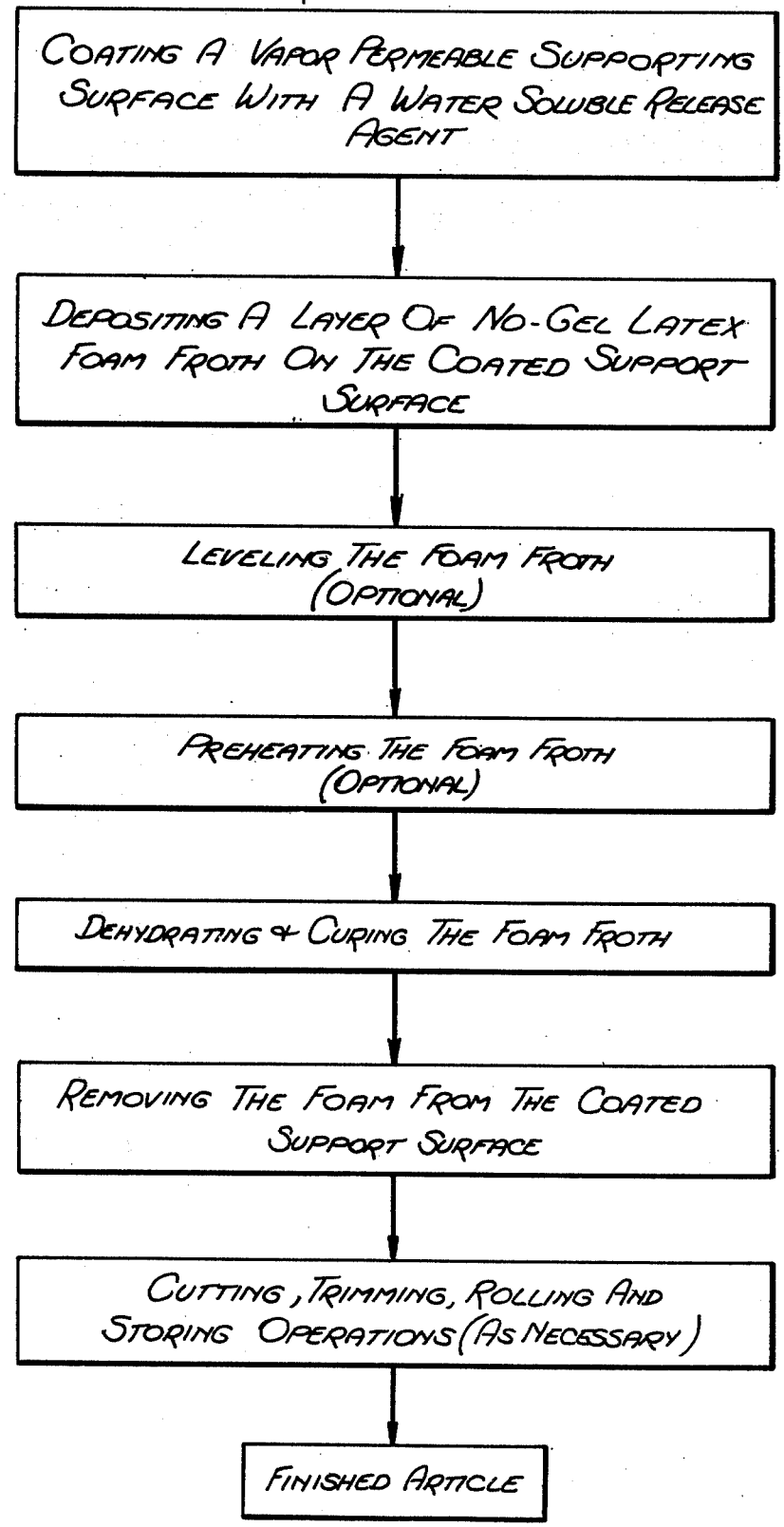

NO-GEL LATEX FOAM

This application is a continuation of application Ser. No. 626,961 filed Oct. 29, 1975, now abandoned.

This invention relates to methods of making latex foams and more particularly to a method of making no-gel latex foam free of any backing material.

No-gel latex foams are generally made from an aqueous emulsion or latex of a polymer that is whipped or frothed with a foaming agent and cured in dry heat as disclosed in Reissue U.S. Pat. No. Re. 27,366. This is in contrast to gellable foams which contain a gelling agent as disclosed in U.S. Pat. No. 2,706,183 and are cured in the presence of saturated steam as disclosed in U.S. Pat. No. 3,243,491.

Although the no-gel latex foam froth contains a foaming agent to maintain the cellular structure of the froth, it has been found beneficial to rapidly dehydrate and cure the foam froth to help ensure formation of a uniform cell structure in the foam product. A relatively rapid dehydration and cure can be obtained by simultaneously heating and dehydrating a layer of the no-gel latex foam froth through a lower supported surface as well as an upper free surface. To accomplish this the latex froth layer is supported on a water vapor-permeable foraminous support means with a vapor-permeable liner disposed between the froth and the support means. The liner, which can be a fabric such as nylon, also permits the nogel latex foam to be easily removed from the support means after curing.

During curing of the foam froth the fabric liner bonds to the latex foam to form an adherent backing that cannot be separated without causing damage to the cured foam. The presence of such a fabric liner as a backing on the resulting foam is in some instances highly desirable because it provides a substantial degree of stitch pullout resistance when the foam is covered with an upholstery material. But the fabric backing can also be an encumbrance since it does not permit unrestricted stretching of the foam and can cause discomfort in those applications where the foam is used for cosmetic padding as in brassieres.

It is thus desirable to provide a no-gel latex foam that does not have a stretch restraining fabric liner.

Among the several objects of the invention may be noted the provision of a novel method for making nogel latex foam free of any backing material, and a novel method of making no-gel latex foam free of any backing material wherein the cured foam can be easily released from a foraminous support. Other objects and features will be in part apparent and in part pointed out hereinafter.

In accordance with the present invention a foraminous water vapor-permeable supporting means comprising a backing material is coated with a water vapor-permeable release agent, and a froth of no-gel polymer latex is deposited onto the backing material over the release agent. The release agent prevents the latex froth from adhering to the backing material and thus functions as a parting layer between the latex foam froth and the backing material. The release agent also permits water vapor to escape from the no-gel latex froth through the supporting means. The deposited froth is dehydrated and cured through its upper free surface as well as its lower supported surface. When the no-gel latex froth is fully cured it can be easily removed from the support means free of any backing material.

For continuous operation of the disclosed method the supporting means can comprise an elongated sheet of backing material on an endless conveyer belt. For batch operation of the disclosed method the supporting means can comprise a peripherally framed foraminous member of finite area.

Regardless of whether the foam is produced continuously or in batch fashion the resultant product is substantially smooth and free of congealed polymer skin, and has a soft feel and hand at both the upper and lower surfaces. The foam body has a substantially open cell structure.

The invention accordingly comprises the methods and constructions hereinafter described, the scope of the invention being indicated in the following claims.

In the accompanying drawings in which various embodiments of the invention are illustrated:

FIG. 1 is a simplified schematic diagram of an apparatus for carrying out continuous operation of the present invention;

FIGS. 2 through 8 are enlarged sectional views taken along lines 2—2 through 8—8 respectively of FIG. 1;

FIG. 9 is an enlarged view of the fragmentary portion 9 in FIG. 7;

FIGS. 10 and 11 are enlarged views of the fragmentary portions 10 and 11 in FIG. 8;

FIG. 12 is a simplified schematic diagram of an apparatus for carrying out batch operation of the present invention;

FIG. 13 is an enlarged sectional view taken along the line 13—13 of FIG. 12; and FIG. 14 is a flow diagram of the invention.

Corresponding reference characters indicate corresponding parts throughout the several views of the drawings.

Figure 1:
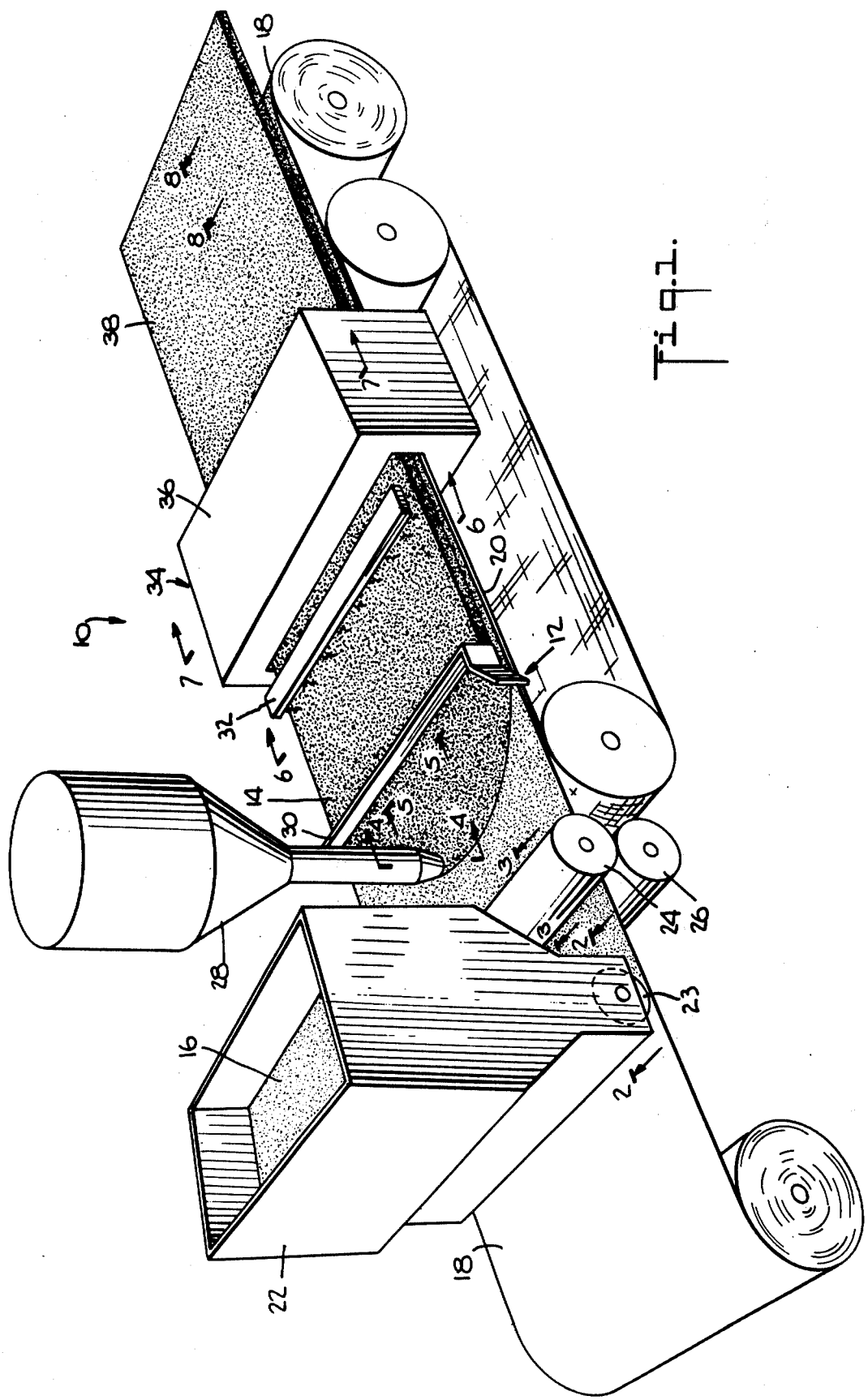
Figure 2:
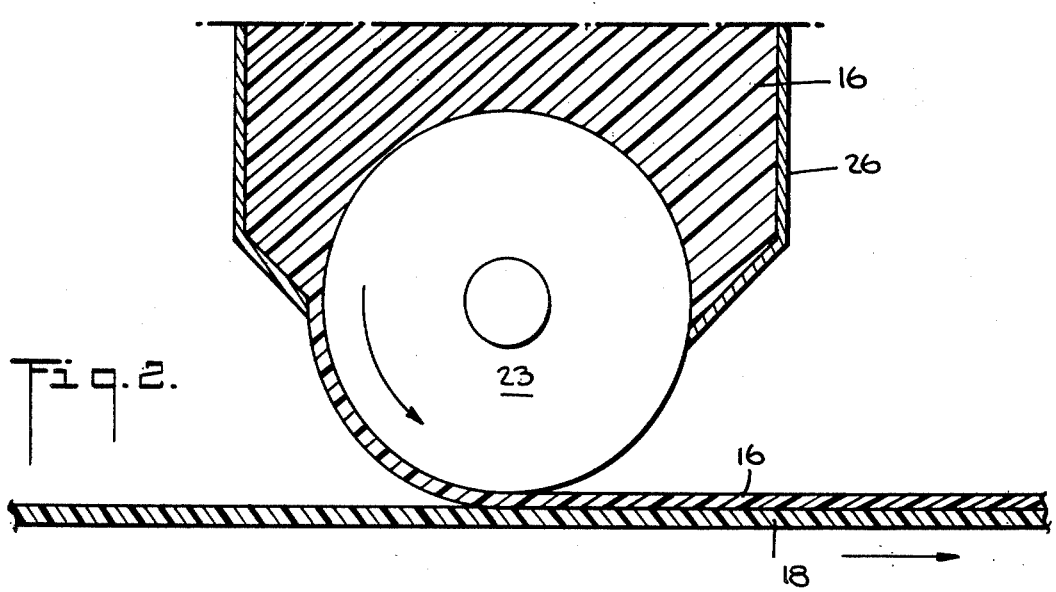
Figure 3:
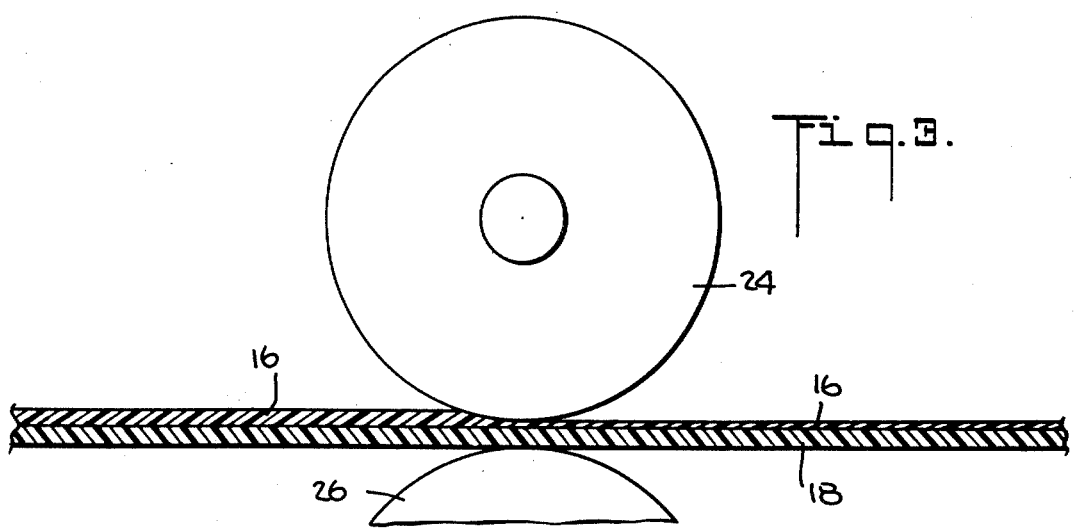
Figure 4:
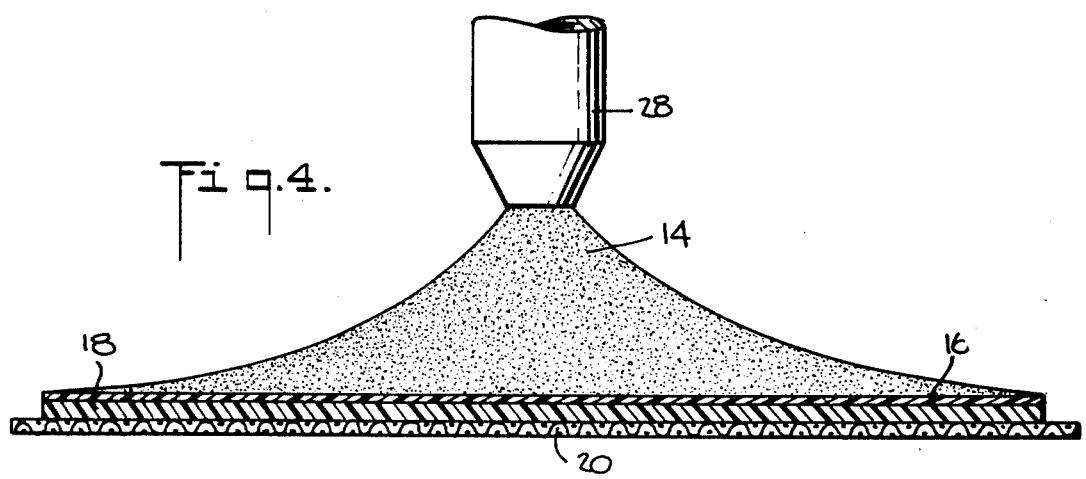

Referring to the drawings for a detailed description of the present invention an apparatus for carrying out continuous operation of the method for making no-gel latex foam is generally indicated by reference number 10 in FIG. 1

The apparatus 10 includes a foraminous supporting means 12 upon which a latex foam froth 14 is deposited and upon which a release agent 16 is coated prior to deposition of the latex foam froth 14.

The supporting means 12 can comprise a water vapor permeable backing material 18 disposed on an endless conveyor belt 20 driven in a circuitous path. The backing material 18 is formed of a suitable woven or nonwoven fabric such as Burlington 116 glass fabric manufactured by Burlington Mills, 6135 rayon manufactured by Scott Paper Co. and heat set polyester sheeting manufactured by Acme Mills. The backing material 18 is permeable to water vapor, withstands the hot moist conditions prevalent during curing of the foam froth 14, and can be reused.

The conveyor belt 20, which is also water vapor permeable can be formed of any suitable material such as wire mesh, or metal links made by the LaPorte Company. The maximum size of the mesh or link openings is not critical as long as the conveyor adequately supports the backing material 18 when it is layered with the no-gel latex foam froth.

The release agent 16 is preferably a water soluble composition such are Carbowax, a solid ethylene glycol polymer, manufactured by Union Carbide and available in molecular weight ranges of about 1500 to about 20,000. Water solutions containing blends of one or more molecular weights of Carbowax can be used. The Carbowax is dispensed onto the backing material 18 in any suitable known manner such as from a conventional dispensation vat 22 having a dispensing roller 23.

A pair of metering rolls 24 and 26 coat or impregnate the Carbowax into the backing material 18. The Carbowax coating is then dried by heating or evaporation (not shown) before being covered with the no-gel latex froth 14. If desired the Carbowax can be applied by spraying or dipping the backing material 18. While portions of the Carbowax, during curing of the no-gel latex foam froth, decompose, sublime or vaporize with the water vapor dehydrating from the froth, the Carbowax serves to shield the backing material 18 from the froth in its adherent state.

A latex designed for use according to the present invention is formulated of ingredients set forth in the following table:

| Ingredient | Parts by Weight, Dry Basis |
|---|---|
| Neoprene (Type 60 or 357, DuPont) | 100.00 |
| Disodium N-octadecyl sulfosuccinamate (CYANASOL 18, American Cyanamid) | 4.00 |
| Sodium hexametaphosphate (CALGON, Calgon Corp.) | 0.50 |
| Dry ground nepheline syenite (MINEX 3, American Syenite Corp.) | 50.00 |
| Alumina trihydrate (HYDRAL C30BF, Alcoa) | 25.00 |
| Antimony Oxide | 5.00 |
| Potassium Hydroxide | 0.25 |
| Sodium salt of sulfate monoester of a mixture of various fatty alcohols, chiefly lauryl alcohol (AQUAREX WAQ, DuPont) | 2.00 |
| Alkylated phenol non-staining antioxidant (NAUGAWHITE, UNIROYAL Chemical) | 1.126 |
| Zinc Oxide | 7.50 |
| Sodium polyacrylate (MODICOL VD, Nopco Chemical) | 0.40 |
| Thiocarbanilide (A-1, Monsanto) | 2.00 |
| Pyrocatechol (Crown Zellerbach) | 1.00 |

The neoprene latex has the following physical properties:

| Total Solids | 60% |
|---|---|
| pH | 10.5 |
| Surface Tension | 39 dynes per cm. |
| Viscosity (ambient temperature) | 350 centipoises |

The latex formulation, without the addition of any gelling agent, is frothed by a suitable known apparatus such as disclosed in U.S. Pat. Nos. 2,695,246, 2,706,108 or 2,731,253. The latex froth 14 is then poured or otherwise deposited onto the backing material 18 over the release agent 16 by a suitable known traversing spout or nozzle 28 such as disclosed in U.S. Pat. No. 2,774,106. A doctoring arrangement 30 can be used, if desired, to facilitate deposition of the latex froth 14 to a uniform thickness on the backing material 18.

The cell structure of the no-gel latex froth 14 is not resistant to collapse despite the presence of foam stabilizers. It is preferable to limit the thickness of the latex froth layer 14 to about 1¼ inches since densification, cell collapse and other similar problems become evident in the cured foam when this layer thickness is exceeded. To minimize the possibility of cell collapse or cell densification the foam froth 14, should be cured and dehydrated rapidly and as soon as possible after it has been deposited onto the backing material 18. However when the latex foam froth 14 is subjected to a rapid cure cycle small fissures or blemishes otherwise known as surface checking (not shown) can form in the foam surface. This condition is not generally objectionable but can be substantially eliminated by preheating the latex froth 14 before subjecting it to a rapid cure.

The preheating is preferably accomplished by any suitable known means of radiant heat such as a bank of Calrod heaters 32 (FIGS. 1 and 6) near the backing material 18, preferably directly above the latex foam froth 14 immediately before a curing area 34. The surface temperature of the no-gel latex froth is usually about 70° F. before being preheated and about 200° F. after being preheated by for example, a five foot long bank of the Calrod heaters 32. The surface temperature rise from 70° F. to 200° F. can occur in a time duration of about 25 seconds to about 200 seconds depending upon the composition of the latex, the thickness of the deposited froth layer 14 and the desired density of the cured no-gel latex foam, all of which determine the speed of movement of the conveyor belt 20 past the bank of Calrod heaters 32. For example a neoprene latex froth one half inch thick is preheated for about 100 seconds. The preheating effects a preliminary dehydration of the no-gel latex froth 14 to a depth of about 1/16 to ⅛ of an inch from the upper free surface of the froth. In instances where surface checking is a tolerable condition in the cured foam 22 the preheating step can be eliminated.

The latex froth 14 and the backing material 18 are conveyed by the conveyor belt 20 to the curing area 34 for subjection to substantially dry heat at a temperature which can range between about 260° F. to about 300° F., depending upon the thickness of the deposited froth layer 14, the desired density of the cured foam, the heat tolerance of the backing material 18 and the heat tolerance of the release agent 16. The no-gel latex foam froth formulations can be cured at temperatures in excess of 300° F. but the Carbowax decomposes at temperatures exceeding this level.

The cure cycle duration for the no-gel latex foam froth 14 is essentially dependent upon the thickness of the froth layer and is not generally affected by the release agent 16. For example a neoprene no-gel latex froth layer ½ inch thick, backed by an Acme 4244X polyester sheet, can be dehydrated and cured at about 300° F. for about 75 minutes. The release agent 16 which can have a coating density of about 5.40 grams/ft.$^2$ is prepared as follows:

| Ingredient | Weight Percentage |
|---|---|
| Water | 64.64 |
| Carbowax 4000 | 21.88 |
| Carbowax 1500 | 13.13 |
| 10% HQMME in alcohol | .35 |
| (Hydroquinone monomethyl ether, Eastman Chemical) | |
| | 100.00 |

The HQMME retards decomposition of the Carbowax. The cured no-gel latex foam layer is characterized by the following properties:

| Density | 7.4 lbs./ft.$^3$ |
|---|---|

| | -continued |
|---|---|
| Compression | 26 lbs/50 sq. in. (RMA) |
| Tensile | 5.6 psi |
| Elongation | 300% |
| Tear | .95 lbs/linear inch |
| Compression Set (22 hrs. at 158° F.) based on deflected height | 10% |

Although any suitable known curing apparatus can be used, an open-ended tunnel-type hot air oven schematically indicated by reference number 36 is preferred. A relatively rapid cure is accomplished since the heat applied during cure causes the froth 14 to dehydrate at its lower supported surface through the release agent 16 the backing material 18, and the conveyor belt 20 as well as at its upper surface as shown in FIG. 7. A possibility of cell collapse or cell densification in the cured foam 22 is thus minimized.

After the cure cycle is completed the cured no-gel latex foam 38 is conveyed by the conveyor belt 20 out of the oven 36 for stripping of the foam from the backing material 18. The Carbowax tends to slightly adhere the foam 38 to the backing material 18 when it cools. It is thus preferred to strip the cured foam 38 from the backing material 18 while the release agent 16 is still hot. However hot neoprene foam is usually tender. Therefore, to minimize the possibility of damage to the neoprene during the stripping operation cool air is blown onto the upper foam surface (not shown) to toughen it at the separation point.

A residue of the release agent 16 is left on the backing material 18 and on the undersurface of the foam at the separation point (FIG. 11), the residue 16 on the foam surface usually being an insignificant amount. However cool air can be blown against the undersurface of the stripped foam to minimize any tackiness between overlapping foam surfaces as where the foam stock is wound into a roll.

The separated foam 38, if desired, can also be cut, or otherwise handled in preparation for its intended use.

Some applications of the no-gel latex foam product include furniture cushions, presser pads in clothes pressing equipment, automobile trim pads, cosmetic foam, as in brassieres, and topper pads in mattresses, etc.

In a similar manner the no-gel latex foam can be formed in a batch method rather than a continuous method as previously described. Accordingly in the batch method a supporting means 40 comprises a foraminous plate or wire screen 42 of finite area bounded by a peripheral frame 44 of any suitable shape and material mounted upon a foraminous conveyor belt 46 similar to the conveyor 20 (FIG. 14). A flange 48 provided around the frame 44 catches any latex froth 14 overflowing the confines of the frame 44. The foraminous supporting means 40 is covered with a preshaped backing material 50 (FIG. 13) similar to the backing material 18. The backing material 50 is precoated with the release agent 16 in any suitable previously described manner. The frame 44, prior to use, is treated with a suitable conventional lubricant or mold release agent such as MR-214 manufactured by Green Chemical Products of Illinois. While MR-214 provides acceptable release of the no-gel latex foam from a metal surface after curing, it does not release the foam from a textile surface such as the backing material 18 without causing damage to the foam layer.

A nozzle 52 deposits predetermined amounts of the latex foam froth 14 as previously formulated onto the supporting means 40 over the backing material 50 within the confines of the frame 44. The deposited froth is doctored, if desired, by a blade 54 and transported by the conveyor belt 46 into a dry air over 56 similar to the oven 36. This arrangement permits dehydration of the undersurface of the latex foam froth 16 through the Carbowax release agent, backing material 50, the wire screen 42 and the conveyor belt 46. Dehydration also occurs at the upper free surface of the latex foam froth 14. Curing times and temperatures are as previously described and if desired, the foam froth can also be preheated by the Calrod heaters 32 as disclosed.

After curing is completed the cured foam 58 is removed from the supporting means 40 for use as is or it can be trimmed or otherwise handled preparatory to formation of a finished article. The resultant foam structure produced by the continuous or batch methods is characterized by a soft hand and feel at the upper and lower surfaces which are substantially smooth and free of congealed polymer skin.

As will be apparent to those skilled in the art the disclosed methods can be used with various other no-gel latex formulations. For example latexes based on styrene-butadiene rubber, natural rubber and blends of natural rubber can be used to form the no-gel latex foam froth in accordance with the present invention. It should be noted however that the latex froth is prepared from one or more monomers, each of which is devoid of pendant reactive groups. U.S. Pat. No. 3,650,995, which relates to the manufacture of shaped articles of latex foam from a wet froth of the latex, requires a latex polymer having reactive substituent groups mixed with co-reactive material having substituent groups co-reactive with the reactive groups on the polymer.

An advantage of the present method for forming no-gel latex foam is that the resultant product does not have a backing material and is easily released from the foraminous supporting means after cure. Another advantage is the economy of the disclosed methods since the backing material is reusable.

In view of the above it will be seen that the several objects of the invention are achieved and other advantageous results obtained.

As various changes can be made in the above methods without departing from the scope of the invention it is intended that all matter contained in the above description shall be interpreted as illustrative and not in a limited sense.

What is claimed is:
1. A method for making no-gel latex foam comprising
    (a) coating a water vapor permeable supporting means with a water vapor permeable water soluble release agent, comprising a polyethylene glycol polymer having a molecular weight range of 1,500 to 20,000,
    (b) depositing a froth of uncured no-gel latex foam onto the supporting means over the coating, said no-gel latex froth being prepared from one or more monomers each of which is devoid of pendant reactive groups,
    (c) heating the latex foam froth to dehydrate, cure and form the no-gel latex foam, and
    (d) separating the foam from the supporting means.
2. The method of claim 1 wherein the supporting means is foraminous.
3. The method of claim 2 wherein the supporting means is a conveyor belt.

4. The method of claim 1 wherein the supporting means includes a sheet of water vapor permeable backing material.

5. The method of claim 4 wherein the backing material moves from a 1st location to a 2nd location and during said movement is in a consecutive fashion continuously coated with the release agent, continuously receives deposition of the foam froth over the release agent, and the foam froth is continuously heated to dehydrate, cure and form the no-gel latex foam in a continuous sheet.

6. The method of claim 4 wherein the backing material is a textile.

7. The method of claim 4 wherein the backing material is glass or polyester.

8. The method of claim 1 wherein the release agent comprises a water solution including blends of one or more of the molecular weights of the polyethylene glycol polymer.

9. The method of claim 8 wherein the release agent includes hydroquinone monomethyl ether.

10. The method of claim 1 wherein said latex froth is based on a copolymer of styrene and butadiene.

11. The method of claim 1 wherein said latex froth is based on neoprene.

12. The method of claim 1 wherein said latex froth is based on a latex of natural rubber or blends of natural rubber latices.

13. The method of claim 1 wherein after the latex froth is deposited onto the supporting means an upper free surface of the latex froth is subjected to a heat defined as preheat.

14. The method of claim 13 wherein said preheat is conducted at a temperature range of about 70° F. to 200° F.

15. The method of claim 14 wherein the duration of preheat is about 25 seconds to about 200 seconds.

16. The method of claim 1 wherein the heating of latex foam froth is carried out at a temperature range of about 260° F. to about 300° F.

17. The method of claim 1 wherein the curing of the latex foam froth is carried out at a temperature of about 300° F. for about 75 minutes.

18. The method of claim 1 wherein the separation step further comprises stripping the cured foam from the supporting means by separating the undersurface of the cured foam from the supporting means while the release agent is relatively hot, and directing relatively cool air onto the upper surface of the cured foam at the separation point.

19. The method of claim 18 further including directing relatively cool air against the undersurface of the cured foam after it has been stripped from the supporting means.

20. A product prepared in accordance with the method of claim 1.

* * * * *